United States Patent
Banikazemi et al.

(10) Patent No.: US 10,511,490 B2
(45) Date of Patent: Dec. 17, 2019

(54) AUTOMATED CONFIGURATION OF SOFTWARE DEFINED NETWORK CONTROLLER

(71) Applicant: INTERNATIONAL BUSINESS MACHINES CORPORATION, Armonk, NY (US)

(72) Inventors: Mohammad Banikazemi, New York, NY (US); David P. Olshefski, New York, NY (US); John M. Tracey, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 14/744,818

(22) Filed: Jun. 19, 2015

(65) Prior Publication Data

US 2016/0373310 A1    Dec. 22, 2016

(51) Int. Cl.
*H04L 12/24* (2006.01)
*H04L 29/08* (2006.01)

(52) U.S. Cl.
CPC .......... *H04L 41/20* (2013.01); *H04L 41/0803* (2013.01); *H04L 67/34* (2013.01); *H04L 67/02* (2013.01)

(58) Field of Classification Search
None
See application file for complete search history.

(56) References Cited

U.S. PATENT DOCUMENTS

| 6,937,877 | B2 | 8/2005 | Davenport |
| 8,050,708 | B2 | 11/2011 | March et al. |
| 2014/0193154 | A1* | 7/2014 | Graham ................. H04L 67/28 398/79 |
| 2014/0325038 | A1* | 10/2014 | Kis ..................... H04L 41/0803 709/220 |
| 2015/0112933 | A1* | 4/2015 | Satapathy ......... G06F 17/30575 707/634 |
| 2015/0350077 | A1* | 12/2015 | Durrani ................. H04L 45/745 709/225 |
| 2015/0350102 | A1* | 12/2015 | Leon-Garcia .......... H04L 41/12 709/226 |
| 2018/0145902 | A1* | 5/2018 | Grosso |

FOREIGN PATENT DOCUMENTS

GB    2350749    6/2000

OTHER PUBLICATIONS

Wikipedia contributors. "Software-defined networking (SDN)." Wikipedia, The Free Encyclopedia, Jun. 18, 2014. <https://en.wikipedia.org/w/index.php?title=Software-defined networking&oldid=613412405>, pp. 1-7 (Year: 2014).*

* cited by examiner

*Primary Examiner* — Thomas J Dailey
(74) *Attorney, Agent, or Firm* — Tutunjian & Bitetto, P.C.; Jennifer Davis (57) ABSTRACT

A method and system are provided. The method includes automatically transferring configuration information from at least one network device to at least one software defined networking controller. The automatically transferring step includes retrieving configuration information associated with the at least one network device, converting the configuration information into a format usable by the at least one software defined networking controller, and configuring the at least one software defined networking controller with the converted configuration information.

20 Claims, 6 Drawing Sheets

AUTOMATED CONFIGURATION OF SOFTWARE DEFINED NETWORK CONTROLLER

BACKGROUND

Technical Field

The present invention relates generally to networks and, in particular, to an automated configuration of a software defined network (SDN) controller.

Description of the Related Art

As software defined networking (SDN) is deployed, there is a need to transfer configuration information from currently deployed network devices (such as, for example, switches, routers, firewalls, and so forth) to SDN controllers. For example, consider a set of Ethernet switches that are configured to support a set of Virtual Local Area Networks (VLANs), each associated with a set of switch ports. When an SDN controller is deployed to control these switches, there is a need to configure the controller with the VLAN information in order to maintain the correct behavior of the switches with regard to the VLANs.

There are many types of configuration information that can be involved in a SDN. For example, such configuration information can relate, but is not limited to, any of the following: VLANs; Quality of Service (QoS); Internet Protocol (IP) routing; Dynamic Host Configuration Protocol (DHCP); Simple Network Management Protocol; and so forth. Currently, the process of transferring such configuration information from one or more deployed network devices to a SDN controller must be performed manually. This is a time consuming and error-prone process.

SUMMARY

According to an aspect of the present principles, a method is provided. The method includes automatically transferring configuration information from at least one network device to at least one software defined networking controller. The automatically transferring step includes retrieving configuration information associated with the at least one network device, converting the configuration information into a format usable by the at least one software defined networking controller, and configuring the at least one software defined networking controller with the converted configuration information.

According to another aspect of the present principles, a system is provided. The system includes an SDN controller for automatically transferring configuration information from at least one network device to at least one software defined networking controller. The SDN controller retrieves configuration information associated with the at least one network device, converts the configuration information into a format usable by the at least one software defined networking controller, and configures the at least one software defined networking controller with the converted configuration information.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to an automated configuration of a software defined network (SDN) controller.

In an embodiment, the present principles automate the capture of configuration information from one or more network devices and configure one or more SDN controllers with the configuration information in order to maintain the currently configured behavior of the network devices.

Figure 1:
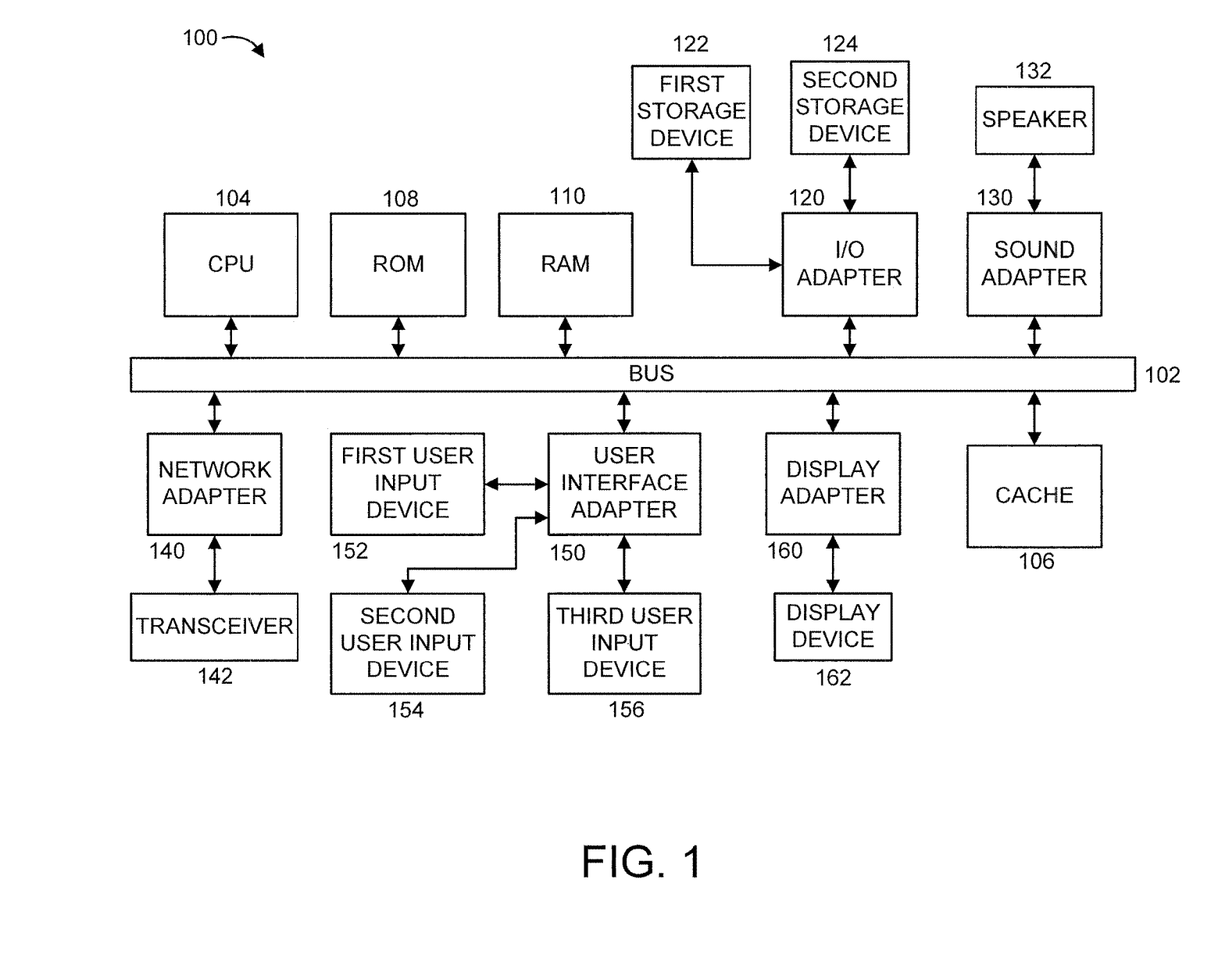
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
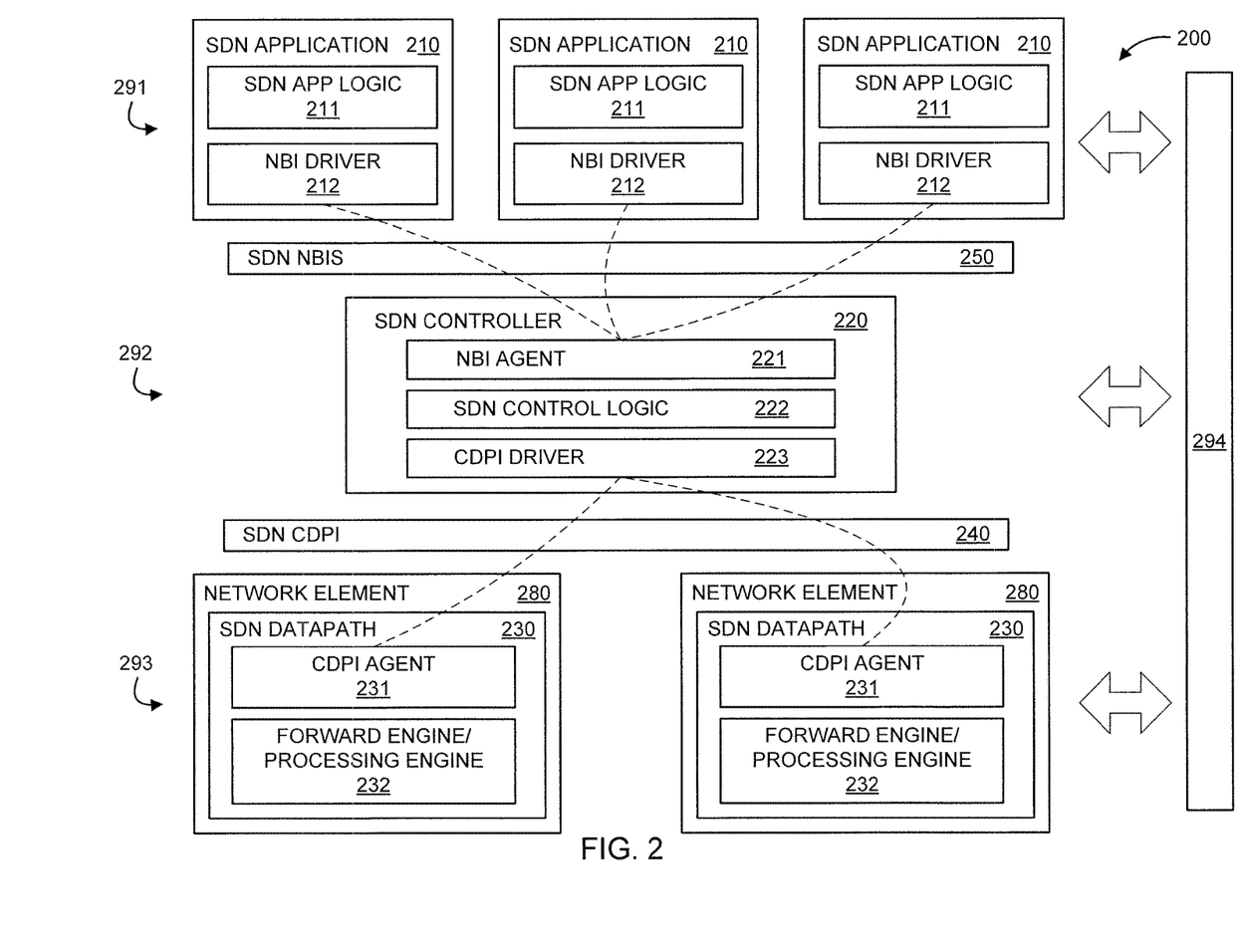
FIG. 2 shows an exemplary system 200 for automated configuration of a Software Defined Network (SDN) controller, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
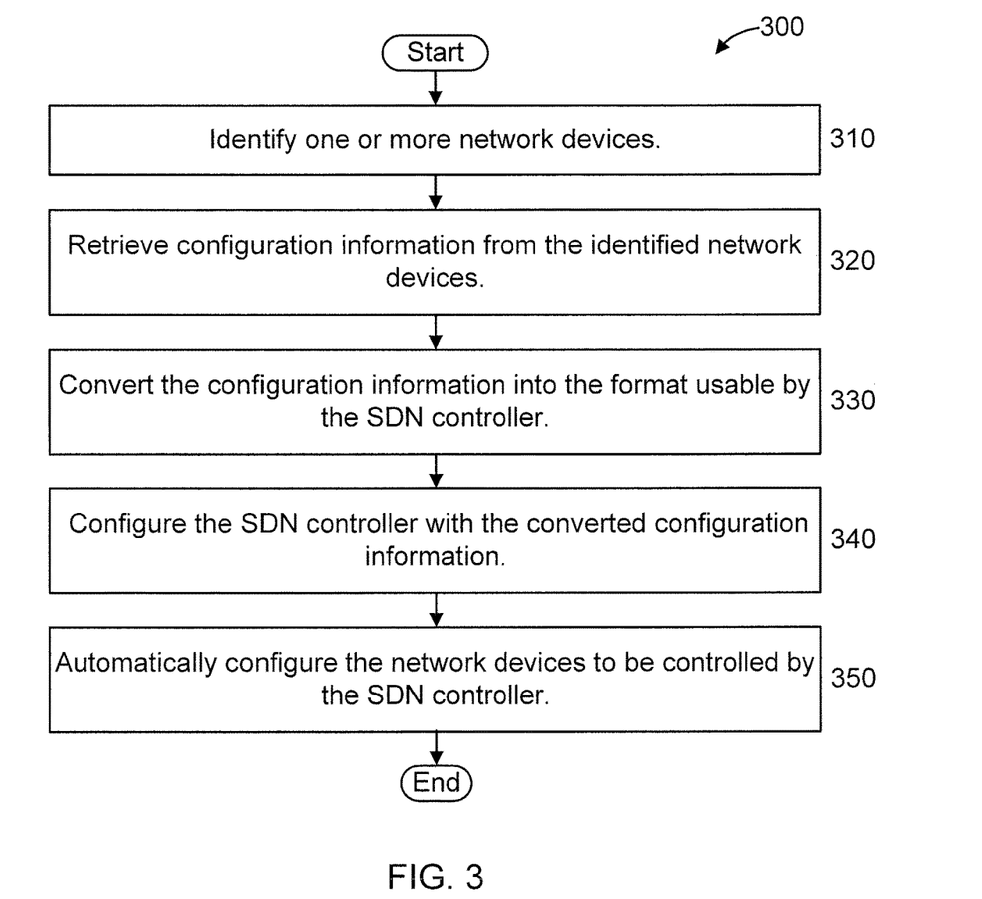
FIG. 3 shows an exemplary method 300 for automated configuration of a Software Defined Network (SDN) controller, in accordance with an embodiment of the present principles.

Further, it is to be appreciated that processing system 100 may perform at least part of the method described herein including, for example, at least part of method 300 of FIG. 3. Similarly, part or all of system 200 may be used to perform at least part of method 300 of FIG. 3.

FIG. 2 shows an exemplary system 200 for automated configuration of a Software Defined Network (SDN) controller, in accordance with an embodiment of the present principles. In the embodiment of FIG. 2, system 200 is a software defined network. The system 200 includes an application plane 291, a control plane 292, a data plane 293, and a management and administration plane 294.

The system 200 includes SDN applications 210, an SDN controller 220, SDN Datapaths 230, an SDN Control to Data-Plane Interface (CDPI) 240, and SDN Northbound Interfaces (NBI) 250.

The SDN Applications 210 are programs that explicitly, directly, and programmatically communicate their network requirements and desired network behavior to the SDN Controller 220 via a northbound interface (NBI). In addition, the SDN Applications 210 can consume an abstracted view of the network for their internal decision making purposes. Each of the SDN Applications can include an SDN Application (APP) Logic 211 and one or more NBI Drivers 212. The SDN Applications 210 can themselves expose another layer of abstracted network control, thereby offering one or more higher-level NBIs through respective NBI agents.

The SDN Controller 220 translates the requirements from the SDN Application layer down to the SDN Datapaths and provides the SDN Applications 210 with an abstract view of the network (which may include statistics and events). The SDN Controller 220 includes one or more NBI Agents 221, an SDN Control Logic 222, and a Control to Data-Plane Interface (CDPI) driver 223.

In an embodiment, the SDN controller 220 is a logically centralized entity. However, in another embodiment, a set of multiple SDN controllers can be used. The controllers can be connected in a hierarchical or peer to peer configuration. Communication interfaces can be used between the controllers. Virtualization or slicing of network resources can be performed in consideration of the controllers.

The SDN Datapaths 230 are logical network devices that exposes visibility and uncontended control over its advertised forwarding and data processing capabilities. The logical representation may include all or a subset of the physical substrate resources. An SDN Datapath 230 includes a CDPI agent 231 and a set of one or more traffic forwarding engines and zero or more traffic processing functions (the traffic forwarding engines and traffic processing engines collectively denoted herein by the reference numeral 232). These engines and functions 232 may include simple forwarding between the datapath's external interfaces or internal traffic processing or termination functions. One or more SDN Datapaths 230 can be included in a single (physical) network element, as an integrated physical combination of communications resources, managed as a unit. An SDN Datapath 230 can also be defined across multiple physical network elements. The SDN Datapath 230 can be implemented to involve one or more of the following: logical to physical mapping; management of shared physical resources; virtualization or slicing of the SDN Datapath; interoperability with non-SDN networking; and data processing functionality. The SDN Datapaths 230 are included within network elements 280.

The SDN CDPI 240 is the interface defined between an SDN Controller and an SDN Datapath, which provides at least (i) programmatic control of forwarding operations, (ii) capabilities advertisement, (iii) statistics reporting, and (iv) event notification. One value of SDN resides in the expectation that the CDPI 240 is implemented in an open, vendor-neutral and interoperable way.

The SDN NBIs 250 are interfaces between the SDN Applications 210 and the SDN Controller(s) 220 and typically provide abstract network views and enable direct expression of network behavior and requirements. This may occur at any level of abstraction (latitude) and across different sets of functionality (longitude). One value of SDN resides in the expectation that these interfaces are implemented in an open, vendor-neutral and interoperable way.

The SDN applications 210 exist in the application plane 291 and communicate their requirements via their NBI drivers 212. The control plane 292 includes the SDN controller 220 that translates these requirements and exerts control over the SDN Datapaths 230 while providing relevant information to the SDN applications 210. The data plane 293 includes network elements 280 whose SDN Datapaths 230 expose their capabilities through their CDPI agents 231. The management and administration plane 294 sets up the network elements 280, assigns the SDN Datapaths 230 to their SDN controller 220, and configures control policies regarding control afforded to the SDN controller 220 and/or any of the SDN applications 210.

In the embodiment shown in FIG. 2, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, while only one SDN controller is shown, other embodiments can involve multiple SDN controllers. These and other variations of the elements of system 200 are readily determined by one of ordinary skill in the art, given the teachings of the present principles provided herein, while maintaining the spirit of the present principles.

FIG. 3 shows an exemplary method 300 for automated configuration of a software defined network (SDN) controller, in accordance with an embodiment of the present principles. The method 300 can be applied in a software defined network such as that shown and described with respect to FIG. 2. In such a case, the SDN controller 220 in FIG. 2 can correspond to the SDN controller mentioned with respect to method 300, and one or more of the network elements 280 in FIG. 2 can correspond to the one or more network devices mentioned with respect to method 300. Of course, method 300 can be applied to other networks having other configurations, as readily appreciated by one of ordinary skill in the art given the teachings of the present principles provided herein, while maintaining the spirit of the present principles.

In an embodiment, method 300 is performed to affect a transfer of configuration information from a legacy controller(s) to a SDN controller(s). In such a case, the one or more network devices mentioned with respect to method 300 can be a legacy controller(s). These and other variations of elements that can be involved in method 300 are readily determined by one of ordinary skill in the art given the teachings of the present principles provided herein, while maintaining the spirit of the present principles.

At step 310, identify one or more network devices. In an embodiment, step 310 can be constrained to identifying specific types of network devices. For example, the identifying can be constrained to identify certain types of network devices (e.g., switches, routers, firewalls, legacy controllers, etc.) so that only a subset of all the network devices in a given software defined network are identified in step 310. In an embodiment, step 310 can involve automatically discovering network devices. In an embodiment, the automatic discovery can be achieved using the auto-discovery feature of SNMP or some other automatic discovery approach not based on and/or otherwise involving SNMP. In an embodiment, step 310 is performed by SDN controller 220.

At step 320, retrieve configuration information from the identified network devices. In an embodiment, step 320 is performed by SDN controller 220 (e.g., the CDPI driver 223).

In an embodiment, the configuration information can be retrieved in step 320 using, for example, but not limited to, any of the following: via a command line interface; by parsing a configuration file that includes the configuration information; via Simple Network Management Protocol (SNMP); and so forth. It is to be appreciated that the configuration information can be resident on the network device to which the configuration information corresponds and/or on another device. Moreover, regarding SNMP, the configuration information can be retrieved using an agent on the network device, a network management station, and so forth. It is to be further appreciated that the preceding ways are merely illustrative and, thus, other ways can also be used to retrieve the configuration information from the network devices while maintaining the spirit of the present principles.

It is to be appreciated that there are multiple types of configuration information to which the present principles can be applied. For example, regarding VLANs, exemplary configuration information can include, but is not limited to, which switch ports are associated with which VLANs, and so forth. Regarding Internet Protocol (IP) routing, exemplary configuration information can include, but is not limited to, which switch ports have which IP addresses and network masks, static routing information, configuration of routing protocols such as routing information protocol (RIP), open shortest path first (OSPF), and border gateway protocol (BGP) and so forth. Regarding SNMP, exemplary configuration information can include, but is not limited to, authorization information for SNMP, and so forth. Regarding DHCP, exemplary configuration information can include, but is not limited to, client and server configuration for DHCP, and so forth. Regarding QoS, exemplary configuration information can include, but is not limited to, per-port QoS configuration and so forth. Regarding authentication and authorization, exemplary configuration can include, but is not limited to, user IDs, passwords, authentication keys, privileges and so forth. Regarding firewall functionality, exemplary configuration information can include, but is not limited to, zone definitions and firewall rules that identify traffic and actions to be performed on said traffic such as accept and deny and so forth. Regarding network address translation (NAT), exemplary configuration information can include, but is not limited to, NAT rules for modifying source and destination address and port values on inbound and outbound network traffic and so forth. Regarding virtual private networks (VPNs), including Internet Protocol security (IPSEC) and transport layer security (TLS) based firewalls, exemplary configuration information can include, but is not limited to, address and port information for virtual tunnel end points (VTEPs), authorization and authentication information for VPN clients and peers, selection and specification of encryption and digest algorithms and so forth. Regarding tunnels, exemplary configuration information can include, but is not limited to, tunnel types such as virtual extensible local area network (VXLAN), generic routing encapsulation (GRE), stateless transport tunneling (STT), and multiprotocol label switching (MPLS), address and port information for virtual tunnel end points (VTEPs) and so forth. Regarding virtual router redundancy protocol (VRRP), exemplary configuration information can include, but is not limited to, advertise intervals, authentication types, authentication credentials, priorities, request for comments (RFC) 3768 compatibility, virtual addresses and so forth.

At step 330, convert the configuration information into the format usable by the SDN controller. In an embodiment, step 330 can involve converting the configuration information for one or more of the network devices to one or more sets of equivalent OpenFlow rules. In an embodiment, step 330 is performed by SDN controller 220 (e.g., CDPI driver 223).

At step 340, configure the SDN controller with the converted configuration information. In an embodiment, step 340 is performed by SDN controller 220 (CDPI driver 223).

It is to be appreciated that step 340 can be performed in a variety of ways, while maintaining the spirit of the present principles. For example, different SDN controllers can support different interfaces for configuration. Thus, depending upon the SDN controller that is involved, any configuration interface thereof can be used for the purposes of the present principles. In an embodiment, an SDN-VE controller by IBM®, which is based on Open Daylight, and which utilizes a REpresentational State Transfer (REST) Application Programming Interface (API), can be used.

Further regarding step 340, in the case that the configuration information includes configuration information from a legacy controller, step 340 enables the (recently deployed) SDN controller to maintain the configured behavior of the legacy controller.

At step 350, automatically configure the network devices to be controlled by the SDN controller. In an embodiment, step 350 can involve programming a network switch or other network device in OpenFlow mode using the set(s) of equivalent OpenFlow rules obtained in step 330. In an embodiment, step 350 is performed by SDN controller 220 (e.g., CDPI driver 223).

It is to be appreciated that while the method 300 of FIG. 3 is described with respect to a single SDN controller, the method 300 can be readily extended for use with multiple SDN controllers, as readily appreciated by one of ordinary skill in the art given the teachings of the present principles provided herein, while maintaining the spirit of the present principles.

Advantageously, the present principles provide many attendant advantages and are readily application to many potential applications, as readily appreciated by one of ordinary skill in the art given the teachings of the present principles provided herein.

For example, in an embodiment, the present principles can be used to extract information from a legacy switch. In an embodiment, the present principles can be used to convert the configuration for a network device to a set of equivalent OpenFlow rules as noted above with respect to method 300 of FIG. 3. In an embodiment, the present principles can be used to program the switch in OpenFlow mode using the preceding set of equivalent OpenFlow rules as noted above with respect to method 300 of FIG. 3.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
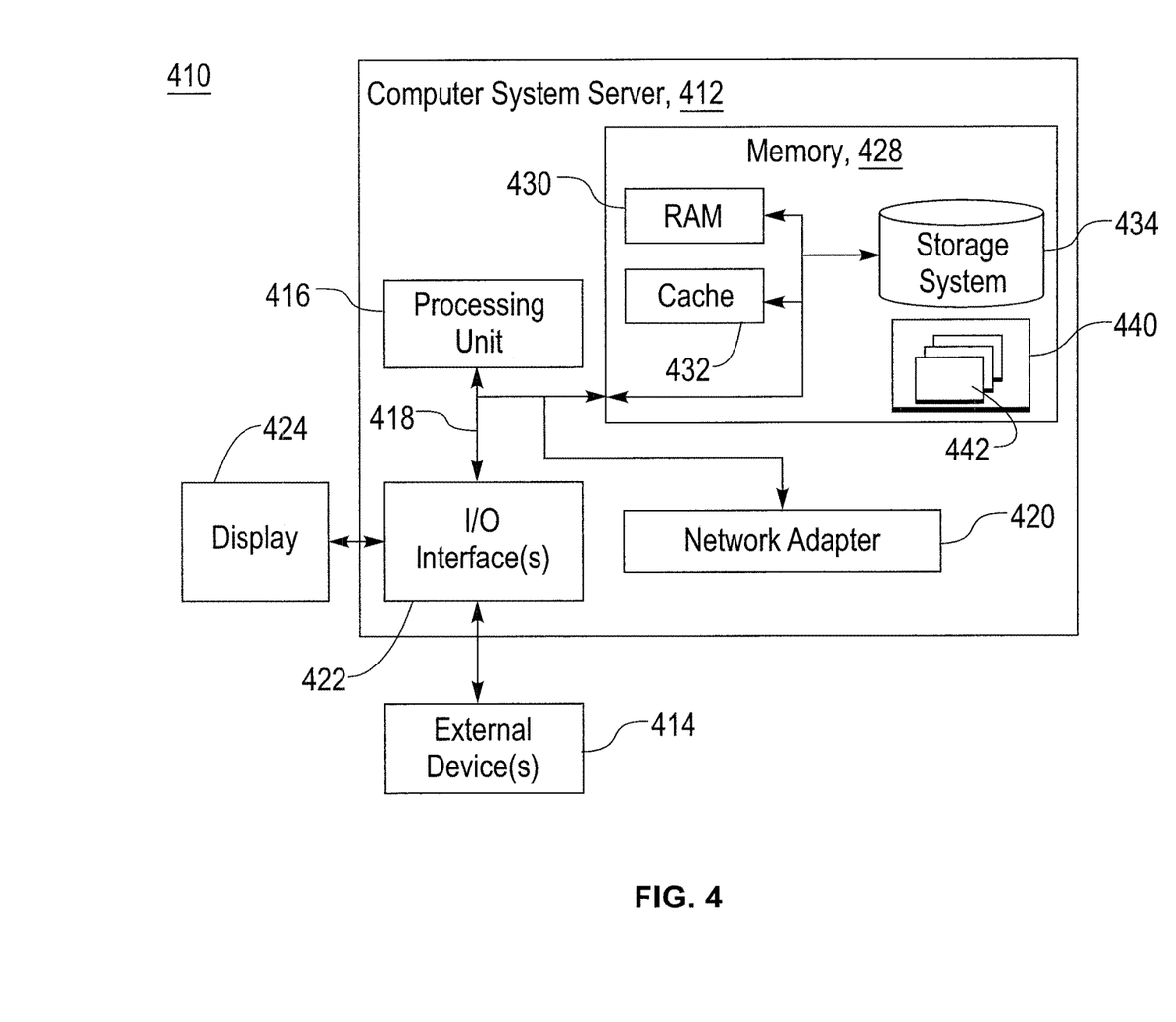
FIG. 4 shows an exemplary cloud computing node 410, in accordance with an embodiment of the present principles.

Referring now to FIG. 4, a schematic of an example of a cloud computing node 410 is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
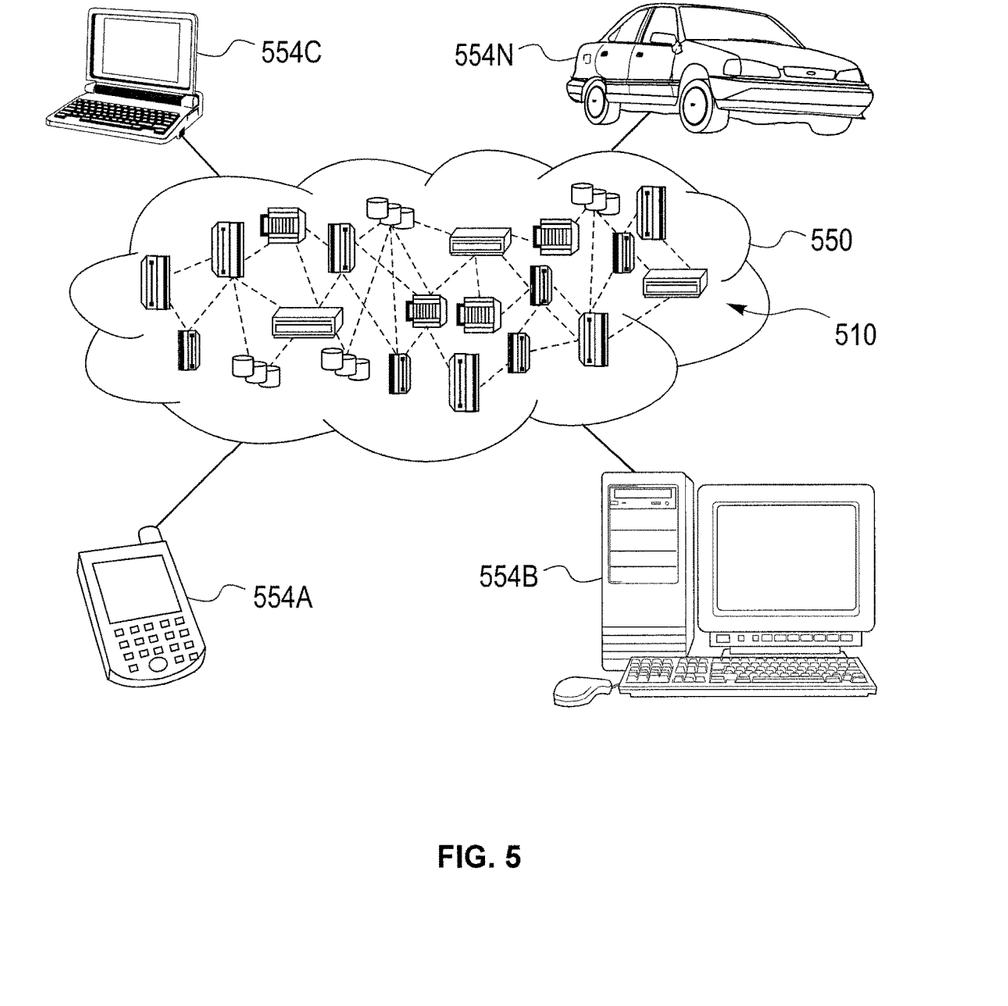
FIG. 5 shows an exemplary cloud computing environment 550, in accordance with an embodiment of the present principles.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
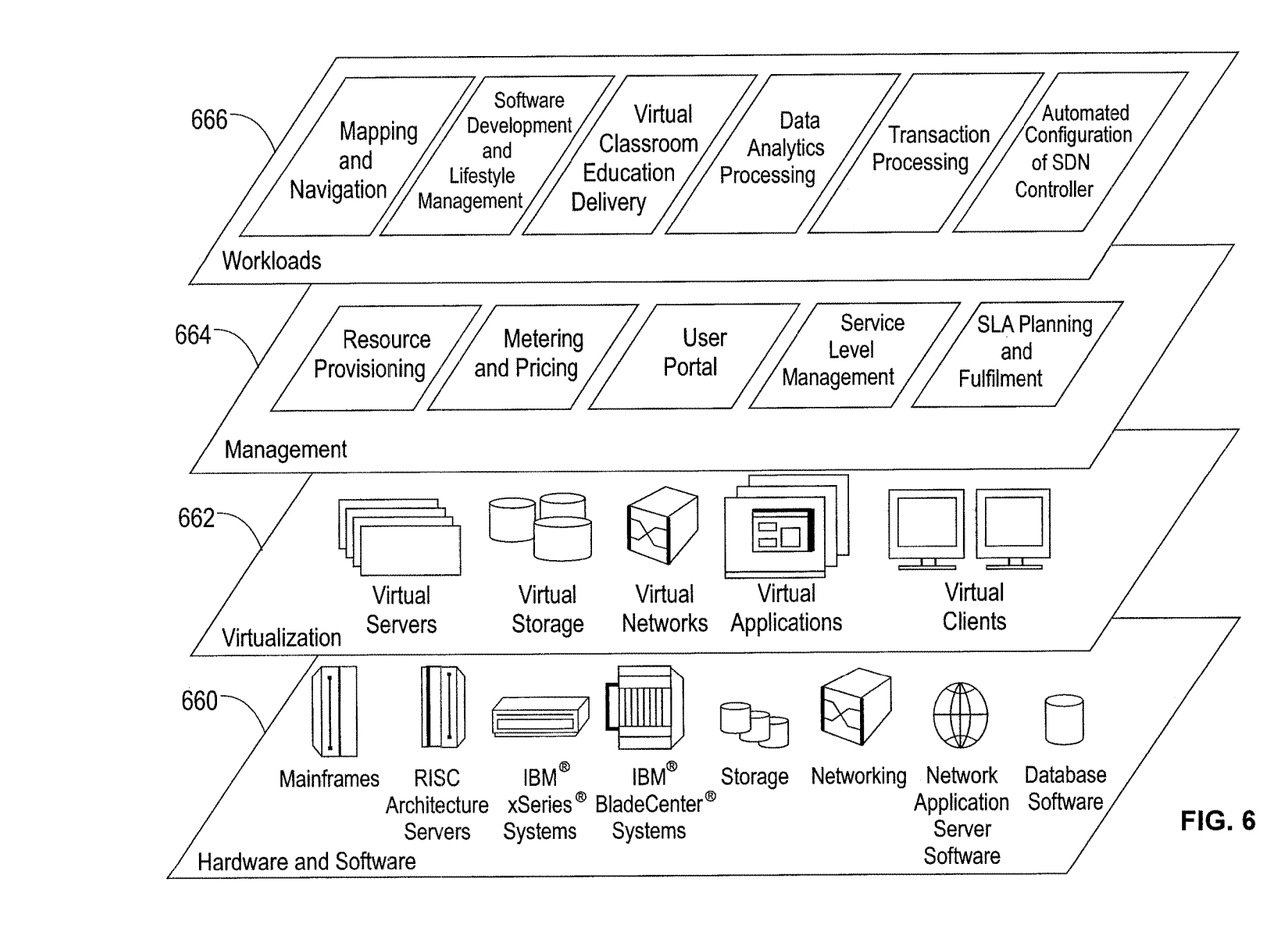
FIG. 6 shows exemplary abstraction model layers, in accordance with an embodiment of the present principles.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automated configuration of a SDN controller.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
   communicating network configuration information and network behaviors of software defined network (SDN) applications directly to at least one software defined networking controller, where each of the SDN applications has only SDN application logic and northbound interface (NBI) drivers and the at least one software defined networking controller has only NBI agents, SDN control logic, and a control to plane interface (CDPI) driver; and
   automatically transferring the configuration information from a plurality of network devices each including a software defined network datapath directly to the at least one software defined networking controller, wherein said automatically transferring step includes:
   identifying a type of each of the plurality of network devices;
   retrieving the configuration information associated with a subset of the plurality of network devices of a certain type and communicated directly to the at least one software defined networking controller;
   converting, solely via the software networking controller, the configuration information associated with a subset of the plurality of network devices of a certain type into one or more sets of equivalent rules defined by a communications protocol to be used by the at least one software defined networking controller; and
   configuring the at least one software defined networking controller with the converted configuration information to maintain currently configured behaviors of the plurality of network devices,
   wherein different SDN controllers concurrently support different configuration interfaces.

2. The method of claim 1, wherein said retrieving step is performed using at least one of a command line interface, Simple Network Management Protocol, and a configuration file.

3. The method of claim 1, wherein the configuration information comprises at least one of Virtual Local Area Network settings, Internet Protocol routing settings, Dynamic Host Configuration Protocol settings, Quality of Service settings, Simple Network Management Protocol settings, authentication settings, authorization settings, firewall settings, network address translation settings, and tunnel configurations.

4. The method of claim 1, wherein said configuring step is performed using a REpresentational State Transfer Application Programming Interface accessed via Hypertext Transfer Protocol.

5. The method of claim 1, further comprising automatically configuring the plurality of network devices to be controlled by the at least one software defined networking controller.

6. The method of claim 1, wherein said automatically transferring step further includes automatically discovering the plurality of network devices.

7. The method of claim 1, wherein the plurality of network devices are automatically discovered using Simple Network Management Protocol.

8. The method of claim 1, wherein the communications protocol is OpenFlow.

9. The method of claim 8, further comprising automatically configuring the plurality of network devices to be in an OpenFlow mode and to be controlled by the at least one software defined networking controller.

10. The method of claim 1, wherein the plurality of network devices are at least one of a switch, a router, a firewall, and a legacy controller.

11. A non-transitory article of manufacture tangibly embodying a computer readable program which when executed causes a computer to perform the steps of claim 1.

12. A system, comprising:
a memory;
at least one processor in communication with the memory; and
software defined network (SDN) applications communicating configuration information and network behaviors directly to at least one software defined networking controller, where each of the SDN applications has only SDN application logic and northbound interface (NBI) drivers and the at least one software defined networking controller has only NBI agents, SDN control logic, and a control to plane interface (CDPI) driver, for automatically transferring the configuration information from a plurality of network devices including a software defined network datapath directly to the at least one software defined networking controller, wherein said software defined networking controller:
identifying a type of each of the plurality of network devices;
retrieves the configuration information associated with a subset of the plurality of network devices of a certain type and communicated directly to the at least one software defined networking controller;
converts, solely via the software networking controller, the configuration information associated with a subset of the plurality of network devices of a certain type into one or more sets of equivalent rules defined by a communications protocol to be used by the at least one software defined networking controller; and
configures the at least one software defined networking controller with the converted configuration information to maintain currently configured behaviors of the plurality of network devices,
wherein different SDN controllers concurrently support different configuration interfaces.

13. The system of claim 12, wherein the configuration information is retrieved using at least one of a command line interface, Simple Network Management Protocol, and a configuration file.

14. The system of claim 12, wherein the configuration information comprises at least one of Virtual Local Area Network settings, Internet Protocol routing settings, Dynamic Host Configuration Protocol settings, Quality of Service settings, Simple Network Management Protocol settings, authentication settings, authorization settings, firewall settings, network address translation settings, and tunnel configurations.

15. The system of claim 12, wherein the at least one software defined networking controller is configured with the converted configuration information using a REpresentational State Transfer Application Programming Interface accessed via Hypertext Transfer Protocol.

16. The system of claim 12, wherein said software defined networking controller automatically configures the plurality of network devices to be controlled by the at least one software defined networking controller.

17. The system of claim 12, wherein said software defined networking controller automatically discovers the plurality of network devices.

18. The system of claim 12, wherein the communications protocol is OpenFlow.

19. The system of claim 18, wherein said software defined networking controller automatically configures the plurality of network devices to be in an OpenFlow mode and to be controlled by the at least one software defined networking controller.

20. The system of claim 12, wherein the plurality of network devices are at least one of a switch, a router, a firewall, and a legacy controller.

* * * * *